Dec. 19, 1922.
E. A. GRAHAM.
COUNTING AND INDICATING MECHANISM.
FILED AUG. 9, 1920.
1,439,097.
4 SHEETS—SHEET 1.
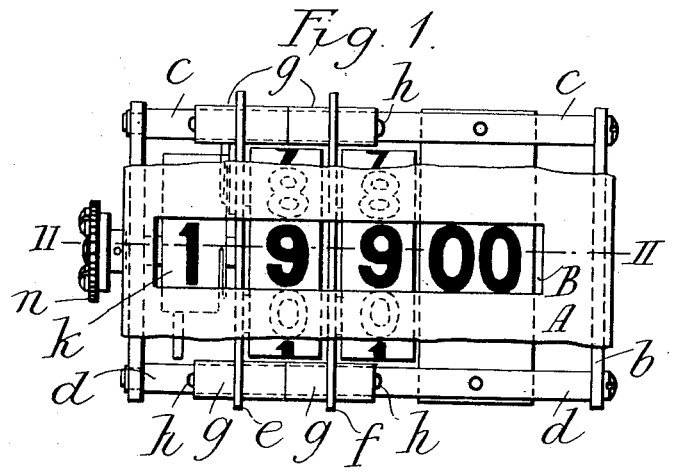
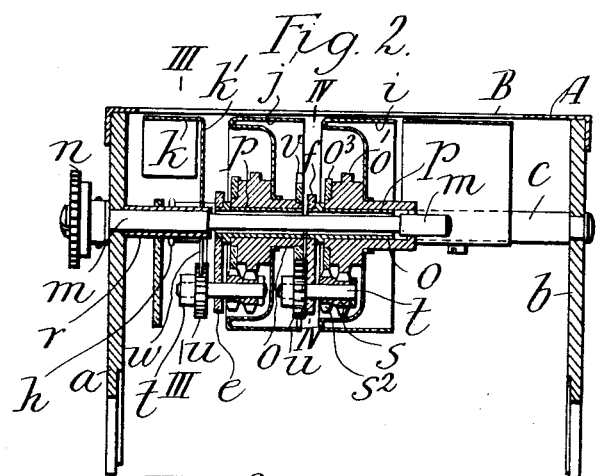
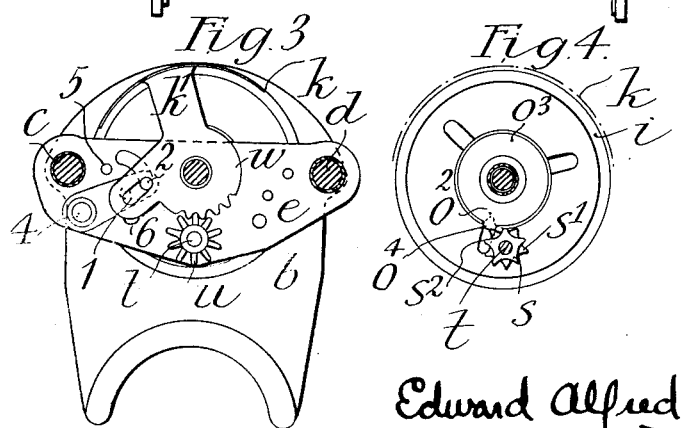
Edward Alfred Graham
by Hubert Peck
Attorney Dec. 19, 1922.
E. A. GRAHAM.
COUNTING AND INDICATING MECHANISM.
FILED AUG. 9, 1920.
1,439,097.
4 SHEETS—SHEET 2.
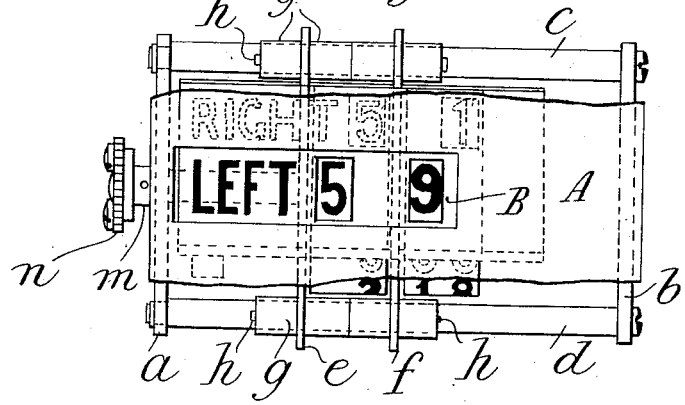
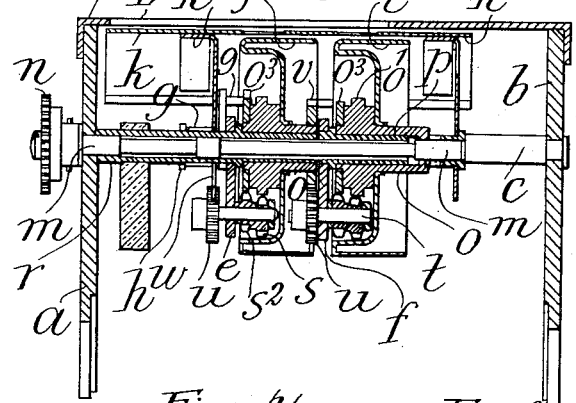
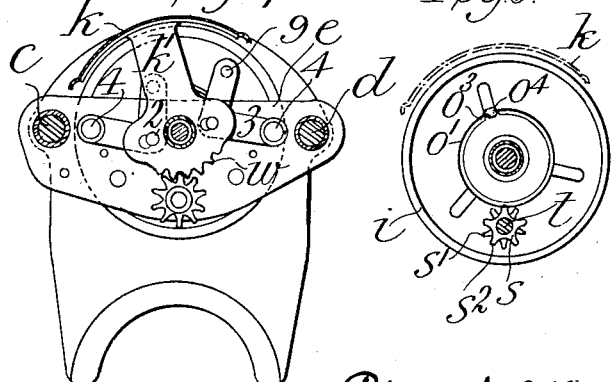

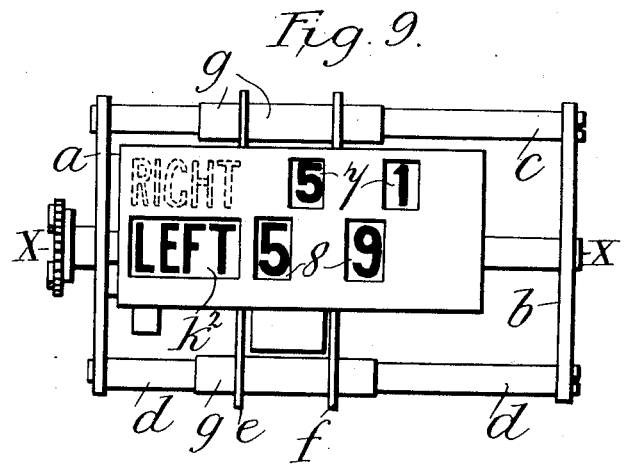
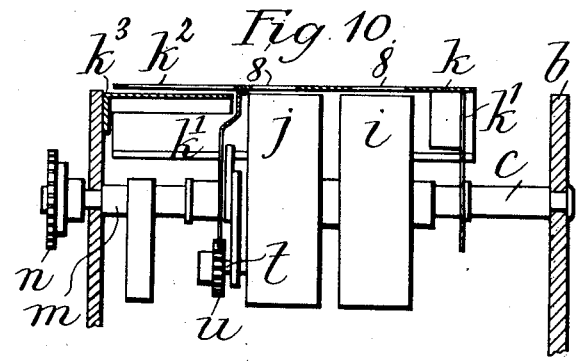
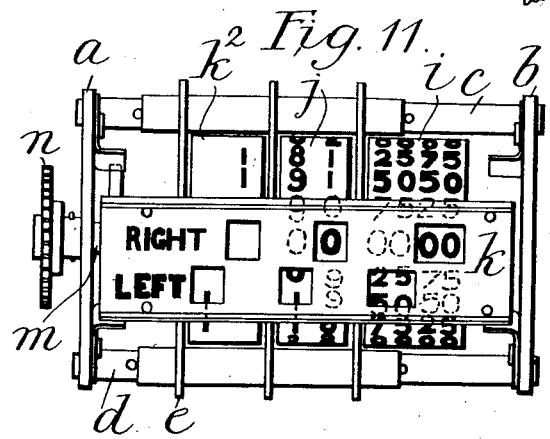

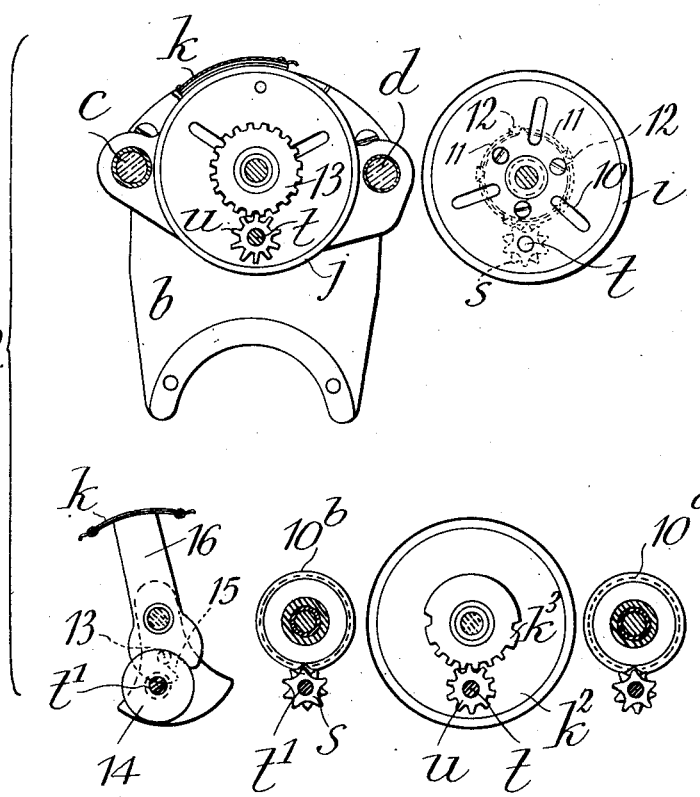

Patented Dec. 19, 1922.

1,439,097

UNITED STATES PATENT OFFICE.

EDWARD ALFRED GRAHAM, OF BROCKLEY, LONDON, ENGLAND.

COUNTING AND INDICATING MECHANISM.

Application filed August 9, 1920. Serial No. 402,382.

*To all whom it may concern:*

Be it known that I, EDWARD ALFRED GRAHAM, a subject of the King of Great Britain and Ireland, residing at Brockley, in the county of London, England, have invented Improvements in Counting and Indicating Mechanism, of which the following is a specification.

This invention relates to counting and indicating mechanism suitable for indicating at a distance, numerical data, such as ranges and deflections for use in connection with the control of artillery or ordnance, or angles of azimuth for navigational purposes, but suitable also for other purposes, and it has for its object so to construct such apparatus that a small lack of alignment in parts required to be co-axial, shall not cause undue friction and so that such mechanism can be readily built up from standard elements. It also has for its object to provide an improved form of means for arresting the mechanism after it has been operated to a predetermined extent in one or each direction.

In counting and indicating apparatus according to the present invention, indicating drums and a supplementary indicating drum, or segment of a drum or perforated shutter, (hereinafter called for brevity and distinction the supplementary drum) are mounted to turn about the axis of a driving shaft common to them and to surround intermittently operated motion transfer gearing located between the indicating and supplementary drums, the drums being separated by transverse plates through which the driving shaft extends and which are carried by and spaced apart upon longitudinal rods connected to end plates to form a frame or cage carrying the other parts of the mechanism. The initial or units drum of the series is driven direct from the driving shaft. The motion transfer mechanism between each adjacent pair of drums may be of known kind comprising an interrupted wheel fixed to a lower drum in the counting series and a double locking and driving pinion in gear with the interrupted wheel and mounted at one side of the corresponding transverse plate upon one end of a spindle, that is journalled in the plate and the other end of which at the other side of the plate, carries a driving member in gear with the next drum in the series. The drums, or some of them, may advantageously be mounted on sleeves or bearings fixed to and carried by the transverse plates.

To limit the extent of rotation of the counting or indicating mechanism, there may be associated with the supplementary drum constituting the last movable member of the mechanism, means adapted to allow of only limited turning motion of such drum and thus to stop the whole mechanism.

The supplementary drum may be adapted to form part of the means affording numerical indications, or to form a shutter to screen certain numerical counting or registering indications and to expose others.

In order that the invention may be clearly understood it will now be further described by the aid of the accompanying illustrative drawings wherein Fig. 1 shows in plan with part of the cover or casing removed, Fig. 2 in longitudinal vertical section on the line II—II of Fig. 1 and Figs. 3 and 4 in cross section on the lines III—III and IV—IV respectively of Fig. 2 one construction of mechanism of the kind herein referred to suitable for use as a counter or range indicator. In Figs. 3 and 4 the cover or casing of the mechanism is removed. Figs. 5, 6, 7 and 8 are similar views to Figs. 1, 2, 3 and 4 respectively showing a modified construction of the mechanism adapted for indicating varying angles, say of azimuth. Fig. 9 shows a plan and Fig. 10 in vertical section on the line X—X of Fig. 9 part of a modified construction. Fig. 11 is a view similar to Fig. 1 of a further modified construction and Fig. 12 is an assemblage of views of details of Fig. 11 in separated relationship.

In the example shown in Figs. 1, 2, 3 and 4 *a* and *b* are two transverse end plates rigidly connected together at a fixed distance apart by longitudinal rods *c* and *d* which are connected together at intermediate parts of their length by cross plates *e* and *f*. These plates are held in spaced relationship on the rods by sleeves *g* that are slipped endways on the rods and held in position endways thereon by pins *h*. The whole forms a readily built up frame or cage to carry the other parts of the counting or indicating mechanism.

*i* and *j* are two main indicating drums and *k* a supplementary drum, perfectly in the form of a segment of a drum as shown, mounted to turn about the axis of a horizontal driving shaft *m* that extends through the end plate $a$ and the transverse plates $e$ and $f$ and is provided at one end with a toothed wheel $n$ by which it can be rotated from any suitable apparatus the revolutions of which, representing for example ranges, are to be indicated by the drums. The drums $i$ and $j$ are each secured to the hub $o$ of an interrupted or mutilated gear wheel that is preferably mounted to turn upon a sleeve $p$ fixed to and carried by the adjoining stationary plate $f$ or $e$ and not upon the shaft $m$. The hub $o$ of the wheel carrying the drum $i$ is fixed to the driving shaft $m$ so as to be driven directly therefrom. The supplementary drum $k$ is fixed to a sleeve $r$ mounted to turn, to a limited extent, on the driving shaft $m$ between the end and transverse plates $a$ and $e$ respectively.

Each interrupted gear wheel carried by one of the hubs $o$ comprises a locking disc $o^1$ having a single tooth spaced $o^2$ formed therein, and a disc $o^3$ carrying a single broad tooth $o^4$ (Fig. 4). This gear wheel coacts with a double locking and driving pinion $s$ having ten teeth arranged in two adjacent sets $s^1$, $s^2$ so that each set has five teeth, the teeth in one set being midway between those of the other set as seen in end view (Fig. 4). Two of the teeth in one set, namely $s^1$ normally rest against the periphery of the locking disc $o^1$ whilst the teeth of the other set, namely $s^2$, are in the plane of the disc $o^3$ so that for each revolution of the gear wheel, the tooth $o^4$ on the disc $o^3$ engages one of the teeth in the set of teeth $s^2$, at the same time that one of the teeth in the set $s^1$ comes opposite the single tooth space $o^2$ in the disc $o^1$ with the result that the pinion $s$ is turned one fifth of a revolution. This form of intermittent motion transfer gear is well known in counting mechanism. The pinion $s$ associated with the gear wheel and drum $i$ is fixed to a spindle $t$ supported in a bearing in the corresponding plate $f$ and to which is also fixed a toothed wheel $u$, the pinion and wheel being at opposite sides of the plate. The wheel $u$ is in gear with a toothed wheel $v$ fixed to the hub $o$ of the next interrupted gear wheel to which the drum $j$ is fixed, the gear ratio of the wheels $u$ and $v$ being as 1 to 2 so that for each rotation of the drum $i$ the drum $j$ will be turned through one tenth of a revolution. Similar motion transfer gearing is, as shown, associated with the drum $j$ and the toothed wheel $u$ thereof is in gear with a toothed segment $w$ on the supplementary drum $k$ so that when the drum $j$ has made one revolution the drum $k$ will be turned from the position shown in Fig. 3 through one tenth of a revolution. From this position it is prevented from being further rotated so as to prevent the counting mechanism being turned in one direction beyond the predetermined extent. For this purpose the radial plate $k^1$ carrying the supplementary drum $k$ is formed with a slot 1 into which extends a pin 2 carried by a lever arm 3 pivoted at 4 and working between fixed stops 5 and 6 carried by the adjacent plate $e$.

In the example now being described, each of the indicating drums $i$ and $j$ has around its periphery a single series of digits, namely, 1, 2, 3, 4, 5, 6, 7, 8, 9, 0. The supplementary drum $k$ has the single figure 1.

The counting mechanism described is arranged within a casing A having in its top or front side a slot B arranged opposite the centre of the drums on the line II—II of Fig. 1, so that only one of the figures on each drum $i$ and $j$ can be seen at one time, the figure 1 on the supplementary drum $k$ coming into view in line with those on the other two drums when it is finally operated as described. By means of the drums $i$ $j$ $k$ the apparatus will indicate up to 199. If it be desired that the drum $i$ instead of being a units drum shall be a hundred drum, as for instance when the apparatus is to be used for indicating varying ranges of one hundred feet or yards at a time, then a second and stationary supplementary partial drum $6^a$, preferably in the form of a segment fixed to the rods $c$ and $d$, may be used as shown, this partial drum having two noughts arranged on its periphery opposite the said slot in the casing as in the example shown.

The apparatus shown in Figs. 5 to 8 inclusive is similar to that shown in Figs. 1 to 4 inclusive except that each indicating drum $i$ and $j$ has on its periphery two series of digits 1 to 0 arranged side by side with the digits in the two series reversely arranged so that 0 in one series is in line transversely with 9 in the adjacent series and the supplementary drum $k$ instead of having the numeral 1 thereon is plain, is extended laterally over the drum $j$ and $i$ and is formed with two rows of apertures, namely 7 and 8, the apertures in one row being staggered in relation to those in the other row and arranged to coincide with one or other of the digits in one of the series thereof on each indicating drum $j$ and $i$. By this means the apparatus is adapted for indicating data changing from positive to negative values passing through a zero value. In this case the supplementary drum $k$ may have thereon two suitable legends, for instance "Right" and "Left" when the mechanism is intended to indicate different angles to the right or left of a distant object, for example the azimuth of an object. The mechanism is arranged, as before, within a casing A having a centrally arranged longitudinal slot B in its upper or front side so that only one or other of the legends and only one or other of the horizontal rows of digits can be seen at one time according to the angular position of the supplementary drum k. In this case the shaft m is intended to be rotated alternatively in opposite directions. When the indication given is Right 0, the next movement of the drums in one direction, will, by means of the toothed wheel u and toothed segment w move the supplementary drum k, into a position to indicate Left 0 and then during the continued operation of the mechanism in the same direction the left angular positions will become visible in succession. In this case there are two bent lever arms 3 each pivoted at 4 and provided with a pin 2 extending into a slot 1 in the radial arm k' carrying the supplementary drum k and with a pin 9 adapted, when the lever is turned downward by the arm k' to come in contact with the top of the adjacent transverse plate e and prevent the mechanism being turned in the same direction beyond the extent for which the indicating mechanism is designed to operate in that direction whilst permitting it to be turned in the opposite direction to a predetermined extent.

Instead of the supplementary drum k having two indications such as Right and Left marked thereon, it may as shown in Figs. 9 and 10 have an aperture $k^2$, formed therein for alternately displaying such indications marked on a separate stationary plate $k^3$ at the rear or underside of it. The casing cover A will in this case have a slot analogous to B of the other examples, of a width, in the direction of movement of the drums, approximately twice as great.

Figs. 11 and 12 illustrate a modification which, for certain purposes, such as the giving of range values, possesses advantages regarding speed of operation compared with the forms of apparatus just described.

In this example, the drums i, j are arranged to move stepwise through a smaller peripheral angle that is to say, through one twentieth of a revolution at each step instead of one tenth, in order, in the case of the drum i, to change the indication at one step. The carry over gears however possess the same ratios as in the examples hereinbefore described but the carry over movement of one drum to that next higher in the train is performed during two indication steps of the drum lower in order. In this way the work of the motor is greatly reduced and consequently a higher speed of transmission is obtainable, the rate at which the indications can be altered being in this case approximately twice that afforded by the devices first described.

In particular, the primary or unit drum i has two peripheral numeral zones each divided circumferentially into twenty divisions and each containing a double row of numerals thus: 00, 25, 50 and 75, such series being repeated five times in each zone and the series of one zone being in inverse order to the series in the companion zone, with however the steps 00 of each series in one zone in line with the steps 00 of the several series in the other zone. The drum j similarly has two circumferential numerical zones with the digits in each row duplicated in order, circumferentially, the numbering being performed in inverse order in the two rows and so that one digit 0 in each row occupies a common longitudinal position into which the remaining digit 0 of each pair can be brought with positive and negative movements of the drum. Each complete series of digits on the drum j ranges from $$0\ 1,\ 2\ \ldots\ \text{to}\ 9.$$
$$0\ 1,\ 2\ \quad\ \ 9$$

The drum $k^2$ possesses two duplicate digits $\begin{smallmatrix}1\\1\end{smallmatrix}$ arranged in an equivalent fashion as will be understood from Fig. 11. Such a system is useful for say indicating ranges by twenty five yard increments or decrements from 0 to 1975 in two senses.

As will be seen from Fig. 12 the drum i, constructed and mounted as in the precedingly mentioned modifications, is rigidly connected to the interrupted gear member 10 having however five tooth spaces 11 and five broad teeth 12, whereby the toothed wheel 13 on the drum j is moved five times during one rotation of the drum i.

The carrying over mechanism so disposed, acts as follows:—Assuming the drums to be in the zero position shown, then the drum i whilst rotated in the direction of the arrow in Figs. 11 and 12, will simultaneously expose the numerals 25 in the right hand opening of the shutter k and cause drum j to expose the duplicate 0 in the corresponding shutter opening, the latter 0 remaining exposed until, 50 and 75 on drum i successively appear. Whilst drum i moves to expose 00 however of the following series, the digit 1 on drum j is caused to appear, being followed by the duplicate digit 1 whilst the drum i exposes the following numerals 25, and so on.

The drum j carries the interrupted gear member $10^a$ which drives the drum $k^2$ through the quadrant $k^3$. The drum $k^2$ in turn is provided with the interrupted gear member $10^b$ by which the shutter k is operated through a pin fixed upon a disc 14 and arranged to work in a slot 15 in the shutter arm 16, the disc being fixed to the spindle t' to which is fixed the pinion s' associated with the gear member $10^b$ of drum $k^3$.

What I claim is:—

1. In mechanism of the kind referred to, embodying indicator drums and a shaft common thereto, a supporting cage comprising vertical end plates, transverse plates intermediate thereof, longitudinal rods and spacing means connecting the end and transverse plates together in spaced relationship and a tubular bearing extending to one side of each intermediate transverse plate, such bearings being coaxially arranged and adapted exteriorly to carry the indicator drums and interiorly to surround the shaft common thereto without being in rubbing contact therewith.

2. In mechanism of the kind referred to, the combination with coaxially arranged indicating drums, of a supporting cage comprising vertical end plates, longitudinal rods connecting the end plates together, transverse plates adapted to be slipped axially along the rods to occupy positions between the drums, distancing means maintaining the transverse plates in such position, tubular bearings upon the transverse plates adapted to support the drums, and a shaft passing through said bearings with clearance between it and the bearings.

3. In mechanism of the kind referred to, the combination with coaxially arranged indicating drums, of a frame, aligned tubular bearings supported by the frame and carrying said drums, and a shaft working loosely through said bearings one end of the shaft being mounted in the frame and the other end of the shaft being supported by the outermost movable indicating drum.

Signed at St. Andrews Works, Crofton Park, London, S. E. 4, England, this sixth day of July 1920.

EDWARD ALFRED GRAHAM.